United States Patent Office 3,141,866
Patented July 21, 1964

3,141,866
COPOLYMERS OF VINYL ALKYL ETHERS AND VINYL ESTERS
Frank A. Stuart, Orinda, and Warren Lowe, San Francisco, Calif., assignors to California Research Corporation, San Francisco, Calif., a corporation of Delaware
No Drawing. Filed Aug. 10, 1959, Ser. No. 832,440
3 Claims. (Cl. 260—80.5)

This invention relates to superior new copolymers. More particularly, the invention is concerned with novel copolymers of vinyl alkyl ethers and alkyl esters having unusual thickening properties.

Copolymers are used as modifiers for waxes, asphalts, resins, rubbers and synthetic plastics. They may also be used as gelling agents for liquid hydrocarbons.

In particular, copolymers are used to thicken and improve the viscosity-temperature characteristics of lubricating oils and greases. In such applications, the thickened lubricant compositions provide effective lubrication over a considerable temperature range. Thus, at high temperatures normally encountered in the usual operation of internal combustion engines a lubricant film of adequate thickness is provided while in the same engines the lubricant is sufficiently fluid to circulate freely at conventional low starting temperatures.

It has now been found that surprisingly effective thickeners are provided in the copolymers of (A) vinyl alkyl ether having from 2 to 6 carbon atoms in the alkyl group and (B) at least one ester of the class consisting of alkyl acrylates and alkyl methacrylates having from 4 to 12 carbon atoms in each of the alkyl groups, the total of carbon atoms in the alkyl group of (A) and the average alkyl group of (B) being from about 8 to about 12, the mol ratio of (A) to (B) being approximately 1:1 and the molecular weight of the copolymer being at least 50,000.

The copolymers of the invention as described above possess outstanding thickening properties compared to other closely related copolymers. In lubricating oil compositions in particular, the copolymer thickeners of the invention impart excellent viscosity-temperature properties as indicated by the unusually high viscosity index. The particular balance of the carbon atoms in the alkyl groups of the copolymers as well as the ratio of the specific monomers and the minimum molecular weight are all critical to the superior properties of the copolymers.

The copolymers of the lubricant composition according to the invention have the following general formula:

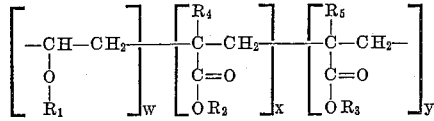

in which $R_1$ is an alkyl group of from 2 to 6 carbon atoms and $R_2$ and $R_3$ are alkyl groups of from 4 to 12 carbon atoms each, all of which may be the same or different from one another, $R_4$ and $R_5$ are members of the class consisting of hydrogen and methyl groups, and $W$, $x$ and $y$ being the relative occurrence of the (A) and (B) monomer units, as mentioned above, in which relationship $w$ is equal to 1 while $x$ and $y$ are fractional numbers, the sum of which is equal to 1, the total occurrence of the monomer units in the formula being equivalent to a molecular weight of at least 50,000 for the total copolymer, the ratio of $w$ to $x+y$ being approximately 1:1 and the total carbon atoms of $wR_1$ and $xR_2+yR_3$ being from about 8 to about 12.

Suitable unsaturated alkyl ethers within the above description include vinyl isobutyl ether, vinyl n-butyl ether, vinyl 2-ethylhexyl ether, etc. For present purposes, the vinyl alkyl ethers having 4 to 6 carbon atoms in the alkyl group are preferred.

Alkyl esters of methacrylic acid and acrylic acid in accordance with the above formula include n-octyl methacrylate, n-octadecyl acrylate, 2-ethylhexyl acrylate, "Oxo" decyl methacrylate, n-butyl methacrylate, etc. The alkyl methacrylates having 4 to 12 carbon atoms in the alkyl groups are presently preferred.

The copolymers are prepared by conventional bulk, solution or emulsion methods, in the presence of an addition-type polymerization initiator. Preferably, the copolymerization is effected in an inert organic solvent, such as benzene, toluene, xylene or petroleum naphtha, in the presence of a free radical-liberating-type initiator such as a peroxy compound, for example, benzoyl peroxide, acetyl peroxide, tert. butyl hydroperoxide, di-tert. butyl peroxide, di-benzoyl peroxide, or di-tert. amyl peroxide, or an azo initiator such as 1,1'-azodicyclohexane-carbonitrile or $\alpha,\alpha'$-azodiisobutyronitrile, or a persulfate, such as potassium persulfate. The catalyst, or polymerization initiator, is employed in an amount of from about 0.1 to 10%, with a preferred range being from 0.10 to 2%. If desired, the catalyst can be added in increments as the reaction proceeds. Likewise, additional portions of the solvent can also be added from time to time in order to maintain the solution in a homogeneous condition. The temperature of copolymerization varies from about 100 to 300° F., with the optimum temperature for any given preparation depending on the nature of the solvent, the concentration of monomers present in the solvent, the catalyst, and the duration of the reaction. Much the same conditions are employed when the copolymerization is effected in bulk rather than in the presence of an inert solvent.

The copolymers have molecular weight of at least about 50,000, as already mentioned. The molecular weight may run as high as several million or more. Polymers having molecular weights of from about 200,000 to about 1,000,000 are preferred. The aforementioned molecular weights are based on standard viscosity determinations.

The following specific example illustrates the preparation of the copolymer of vinyl isobutyl ether, n-butyl acrylate and n-octyl acrylate.

Into a 2-liter, 3-necked flask equipped with water condenser, addition, funnel, thermometer stirring unit and heating means, is charged 9 grams of sodium lauryl sulfate and 420 ml. of distilled water. After stirring at room temperature for 1½ hours, 1½ grams of sodium pyrophosphate, 1½ grams of potassium persulfate and 350 cc. vinyl isobutyl ether are added with stirring. Stirring is continued for 1½ hours and from an addition funnel a mixture is slowly introduced containing 135 grams polymerization inhibitor-free n-octyl acrylate and 32 grams of inhibitor-free n-butyl acrylate. The time of addition is 1½ hours. Temperature of the reaction mixture during reaction is 110 to 120° F.

The total mixture is vigorously stirred at 150 to 160° F. for 4 hours. After heating slowly to 170° F., an exothermic reaction takes place. A cold water bath is used to cool the reaction mixture. The thickened mixture is stirred at 140 to 150° F. for 4 hours. The resulting polymer is coagulated by the addition of 20 grams of hydrated aluminum sulfate, $Al_2(SO_4)_3 \cdot 18H_2O$. After stirring at 140° F. for 2 hours, the lower layer is decanted. A total of 700 ml. distilled water is added to the reaction flask and stirring is continued for 2 hours at 140° F. The polymer is dissolved in 300 ml. of benzene and reprecipitated with 750 ml. of methanol. The solvents are removed from the reaction mixture by distillation under reduced pressure. The copolymer product obtained after the removal of the solvents is the ternary copolymer of vinyl isobutyl ether, n-butyl acrylate and n-octyl acrylate having a mole ratio of 1 to 0.25 to 0.75. The copolymer has a molecular weight of approximately 200,000.

The superior properties of the novel vinyl alkyl ether and alkyl ester copolymers according to the invention are illustrated by their remarkable effect in lubricating oils as shown by data from a number of tests. In these tests, various amounts of the copolymer thickeners are incorporated in the oils as noted in the following table in terms of percent by weight and the improvement in the viscosity index is observed.

Oil A is a solvent refined mineral lubricating oil base containing 45 millimoles per kilogram of basic calcium petroleum sulfonate, 10 millimoles per kilogram of zinc di(alkylphenyl)diethiophosphate and 0.25% by weight of diparaffin polysulfide. The viscosity of Oil A at 100° F. is 179.5 SSU (Saybolt seconds Universal) and the viscosity at 210° F. is 45.07 SSU giving a viscosity index of 96.

Oil B is a solvent refined mineral lubricating oil containing 40 millimoles per kilogram of basic calcium petroleum sulfonate, 6 millimoles per kilogram of zinc di(alkylphenyl)dithiophosphate, 0.25% by weight diparaffin polysulfide and 0.001% by weight of silicone foam inhibitor. The base oil has a viscosity index of 96.

Oil C is a typical 140 neutral mineral lubricating oil. The base oil has a viscosity index of 90.

Oil D is a typical 150 neutral mineral lubricating oil. The base oil has a viscosity index of 90.

with the alkyl esters in similar compositions is about 140 and that with vinyl ether is about 130, the viscosity index with the preferred copolymers of the invention is as high as 170, which is surprisingly better than would be expected from the average of the two types.

We claim:

1. The copolymer of monomers consisting essentially of (A) vinyl alkyl ether having from 4 to 6 carbon atoms in the alkyl group and (B) a member of the class consisting of mixed alkyl acrylates and mixed alkyl methacrylates having from 4 to 12 carbon atoms in the alkyl groups and the total of the number of carbon atoms in the alkyl group of (A) and the average number of carbon atoms in the mixed alkyl groups of (B) being from about 8 to about 12, said alkyl groups consisting entirely of carbon and hydrogen, the mole ratio of (A) to (B) being approximately 1:1 and the molecular weight of the copolymer being at least about 50,000.

2. The copolymer of monomers consisting essentially of (A) vinylisobutyl ether and (B) a mixture of n-butylacrylate and n-octylacrylate in a monomer ratio of 0.25:0.75, the mole ratio of (A) and (B) monomers being approximately 1:1 and the molecular weight of the copolymer being at least about 50,000.

3. The copolymer of monomers consisting essentially of (A) vinyl-n-butyl ether and (B) a mixture of n-butylacrylate and n-octylacrylate in a monomer ratio of 0.75:0.25, the mole ratio of (A) and (B) monomers

*Table*

| Example No. | $R_1$ | $R_2$ | $R_3$ | $R_4$ | $R_5$ | $w$ | $x$ | $y$ | Total $wR_1 + xR_2 + yR_3$ | Oil | Percent Polymer | Approx. Mol. Wt. (Thousands) | Vis., SSU 100° F. | Vis., SSU 210° F. | V.I. |
|---|---|---|---|---|---|---|---|---|---|---|---|---|---|---|---|
| 1 | i-Butyl | n-Butyl | n-Octyl | H | H | 1 | 0.25 | 0.75 | 11 | A | 3.75 | 385 | 476.4 | 80.85 | 139 |
| 2 | n-Butyl | do | do | H | H | 1 | 0.75 | 0.25 | 9 | A | 3.75 | 260 | 222.4 | 70.10 | 167 |
| 3 | do | do | do | H | H | 1 | 0.75 | 0.25 | 9 | A | 4 | 455 | 261.9 | 88.9 | 164 |
| 4 | do | do | do | H | H | 1 | 0.75 | 0.25 | 9 | B | 2 | 175 | 191.4 | 54.8 | 158 |
| 5 | do | do | do | H | H | 1 | 0.75 | 0.25 | 9 | B | 3 | 230 | 210.9 | 63.27 | 165 |
| 6 | do | do | do | H | H | 1 | 0.75 | 0.25 | 9 | B | 4 | 265 | 226.9 | 72.47 | 167 |
| 7 | do | do | do | H | H | 1 | 0.75 | 0.25 | 9 | C | 4 | 300 | 203.5 | 71.11 | 170 |
| 8 | i-Butyl | do | n-Octadecyl | $CH_3$ | $CH_3$ | 1 | 0.5 | 0.5 | 15 | B | 2 | 70 | 216.6 | 50.33 | 125 |
| 9 | do | do | do | $CH_3$ | $CH_3$ | 1 | 0.75 | 0.25 | 11.5 | B | 2 | 80 | 203.1 | 50.55 | 135 |
| 10 | do | 2-Et. hexyl | do | $CH_3$ | $CH_3$ | 1 | 0.5 | 0.5 | 17 | B | 2 | 60 | 213.2 | 49.75 | 124 |
| 11 | do | "Oxo"decyl | do | $CH_3$ | $CH_3$ | 1 | 0.5 | 0.5 | 18 | B | 2 | 80 | 219.6 | 50.45 | 126 |
| 12 | do | 2-Et. hexyl | | H | | 1 | 1 | | 12 | B | 2 | 140 | 244.7 | 53.10 | 129 |
| 13 | do | n-Octyl | | H | | 1 | 1 | | 12 | B | 2 | 140 | 245.4 | 53.10 | 129 |
| 14 | do | 2-Et. hexyl | | H | | 1 | 1 | | 12 | B | 2 | 175 | 259 | 54.89 | 131 |
| 15 | do | n-Butyl | 2-Et. hexyl | H | H | 1 | 0.5 | 0.5 | 10 | E | 4 | 240 | 313.6 | 66.92 | 142 |
| 16 | do | do | do | H | H | 1 | 0.25 | 0.75 | 11 | A | 4 | 285 | 437.4 | 74.32 | 136 |
| 17 | do | 2-Et. hexyl | | H | | 1 | 1 | | 12 | C | 4 | 480 | 507 | 86.83 | 140 |
| 18 | do | n-Octyl | n-Butyl | H | H | 1 | 0.5 | 0.5 | 10 | C | 4 | 260 | 318.4 | 67.85 | 147 |
| 19 | do | n-Hexyl | | H | $CH_3$ | 1 | 1 | | 10 | B | 2 | 385 | 304.1 | 64.14 | 145 |
| 20 | n-Butyl | n-Octyl | n-Butyl | H | H | 1 | 0.25 | 0.75 | 9 | A | 4 | 310 | 326.8 | 76.39 | 154 |
| 21 | do | do | do | H | H | 1 | 0.4 | 0.6 | 9.6 | A | 4 | 395 | 434.7 | 83.81 | 146 |
| 22 | do | n-Decyl | do | H | H | 1 | 0.25 | 0.75 | 9.5 | A | 4 | 295 | 297.7 | 74.84 | 157 |
| 23 | Ethyl | 2-Et. hexyl | | H | | 1 | 1 | | 10 | A | 3.75 | 1,225 | 611 | 149.5 | 147 |
| 24 | 2-Et. hexyl | do | | H | | 1 | 1 | | 16 | A | 3.75 | 115 | 308.6 | 58.18 | 128 |
| 25 | Ethyl | Decyl | | H | | 1 | 1 | | 12 | A | 3.75 | 360 | 462.5 | 78.28 | 138 |

From the tests in the foregoing table, it will be seen that each of the illustrative compositions containing the copolymeric thickeners according to the invention possesses surprisingly improved viscosity temperature properties compared to base oils alone. Furthermore, the particular copolymers of vinyl alkyl ethers and alkyl methacrylates having the appropriate balance of carbon atoms in the alkyl groups are much superior to other closely related copolymers without this proper balance.

The above results are even more surprising when compared to viscosity indexes obtained with homopolymers of either vinyl alkyl ether or alkyl acrylates or alkyl methacrylates alone. Although the viscosity index obtained being approximately 1:1 and the molecular weight of the copolymer being at least about 50,000.

References Cited in the file of this patent

UNITED STATES PATENTS

| | | |
|---|---|---|
| 2,016,490 | Fikentscher | Oct. 8, 1935 |
| 2,436,204 | D'Alelio | Feb. 17, 1948 |
| 2,726,230 | Carlson | Feb. 6, 1955 |
| 2,727,020 | Melamed et al. | Dec. 13, 1955 |
| 2,737,496 | Catlin | Mar. 6, 1956 |
| 2,828,221 | McWherter | Mar. 25, 1958 |
| 2,835,657 | Fikentscher et al. | May 20, 1958 |